Sept. 6, 1949.  I. IVERSON ET AL  2,481,220
FLUID TRANSMISSION SYSTEM
Filed March 15, 1946  3 Sheets-Sheet 1
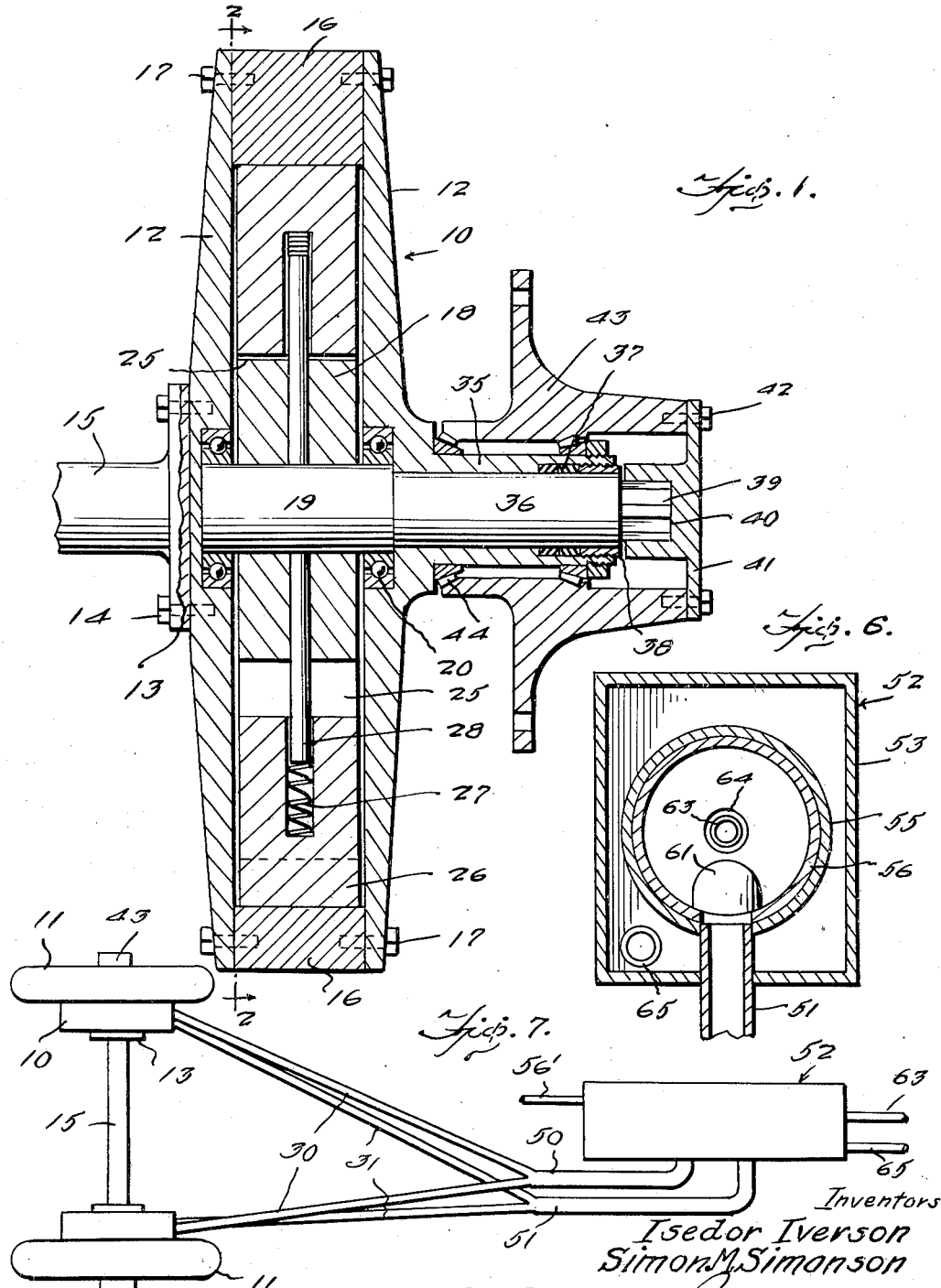
Inventors
Isedor Iverson
Simon M. Simonson
Attorneys

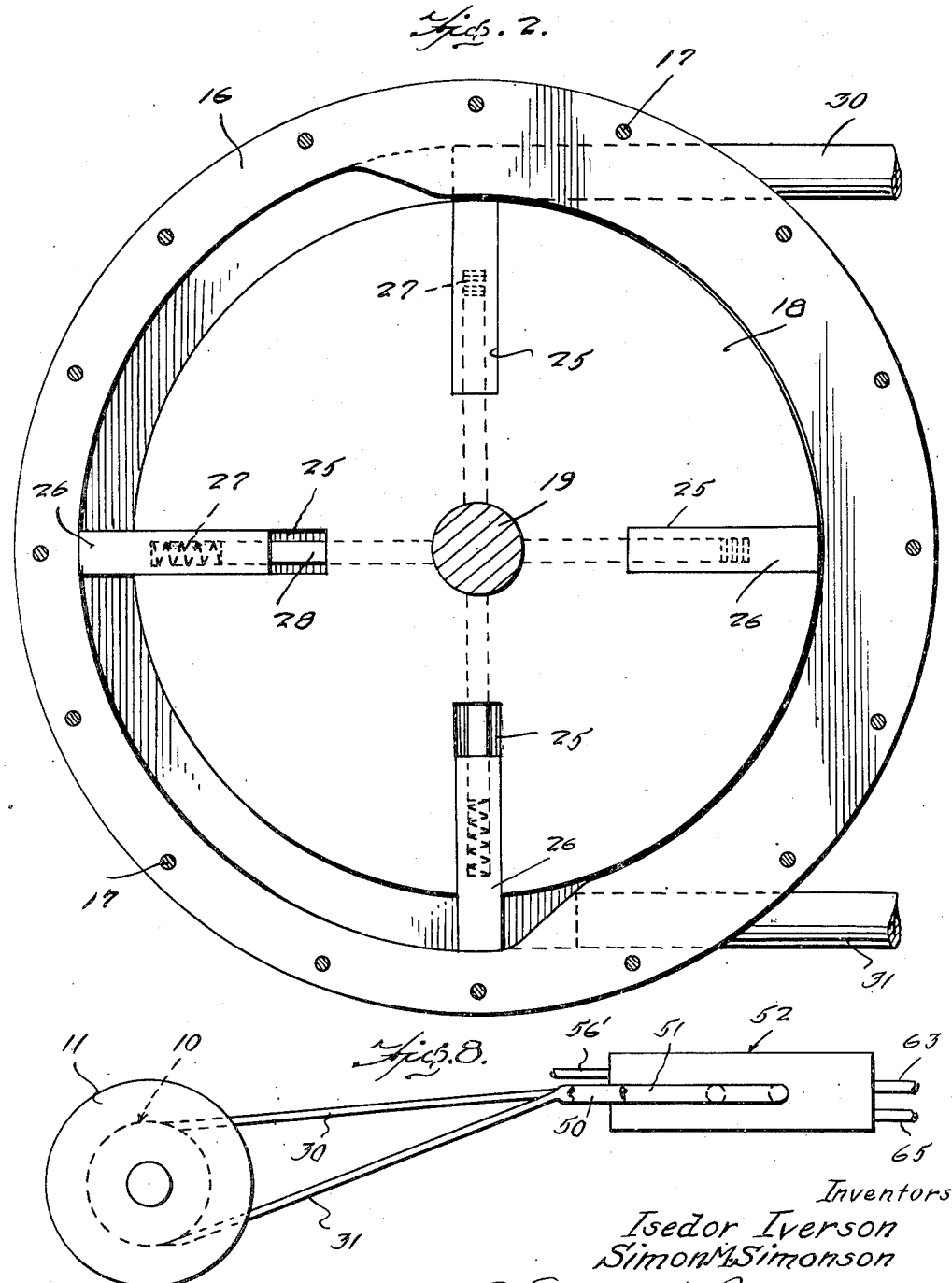

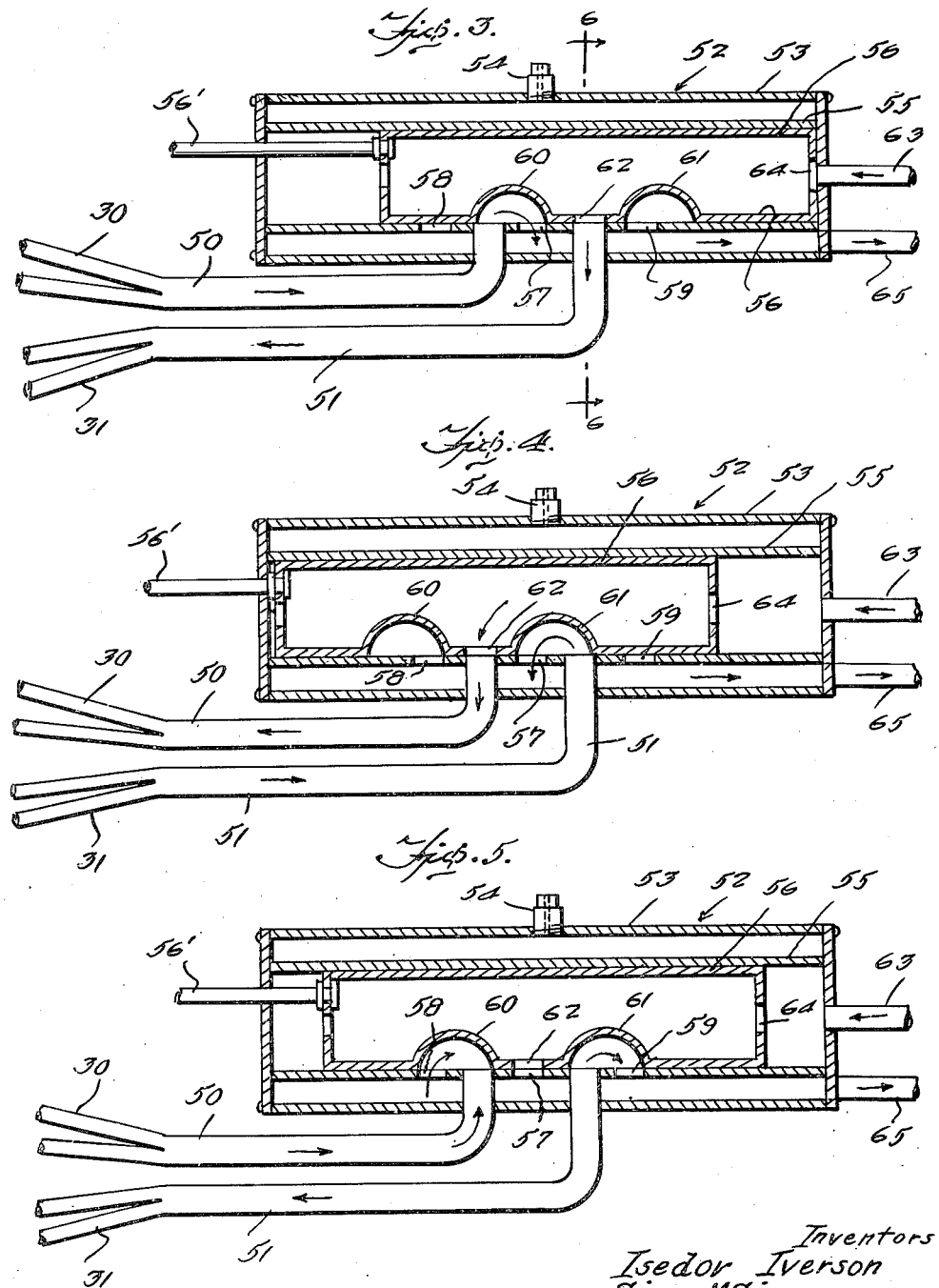

Patented Sept. 6, 1949

2,481,220

UNITED STATES PATENT OFFICE 2,481,220

FLUID TRANSMISSION SYSTEM

Isedor Iverson and Simon M. Simonson,
McGregor, Minn.

Application March 15, 1946, Serial No. 654,633

1 Claim. (Cl. 60—53)

This invention relates to a fluid transmission system, and more particularly to such a system for the driving of vehicles.

A primary object of this invention is the provision of an improved fluid drive system for vehicles, such as trucks, automobiles and the like, characterized by simplicity and smoothness in operation.

An additional object of the invention is the provision of such a system and apparatus therefor, whereby the degree of power transmitted by the system may be readily varied at the will of the operator.

A further and more specific object of the invention is the provision of an improved reverse mechanism adapted to be utilized in conjunction with such a system.

A still further object of the invention is the provision of a drive system for motor vehicles whereby the smoothness of operation, acceleration and deceleration of the vehicle will be materially enhanced.

Still other objects reside in the combinations of elements, arrangements of parts, and features of construction, all as will be more fully pointed out hereinafter, and disclosed in the accompanying drawings, wherein there is shown a preferred embodiment of this inventive concept.

In the drawings:

Figure 1 is a vertical sectional view taken substantially through the center line of one of the drive units of the system, illustratively one of those used in conjunction with the driving wheels.

Figure 2 is a sectional view taken substantially along the line 2—2 of Figure 1 as viewed in the direction indicated by the arrows.

Figures 3, 4 and 5 are longitudinal sectional views taken substantially through the center line of the reverse unit for the system, and showing the parts in different positions of adjustment.

Figure 6 is a sectional view taken substantially along the line 6—6 of Figure 3, as viewed in the direction indicated by the arrows.

Figure 7 is a schematic plan view of a portion of the system showing its relation to the driving wheels of a motor vehicle.

Figure 8 is a schematic view showing the relation of certain of the parts of the system to the driving wheels of a vehicle as viewed from the side.

Similar reference characters refer to similar parts throughout the several views of the drawings.

Summarizing the fluid drive system of the instant invention, it may here be pointed out that the same is comprised of three substantially identical fluid pumps or driving drums, one of which is mounted at a suitable intermediate portion of the vehicle and adapted to be power driven in any desired manner, and connected by means of suitable conduits and through a suitable control mechanism, to be more fully described hereinafter, and additional conduits to the other two drums, one of which is connected to each rear wheel of the vehicle. Inasmuch as the drums are substantially identical, with the exception of the wheel mounting, only one will be described in detail.

Referring particularly now to Figures 1 and 2, there is generally indicated at 10 a driving drum adapted to be associated with one of the rear wheels 11 of the vehicle. The drum is comprised of two side plates 12, one of which is provided with a boss 13 to which is secured, as by means of screws 14, the extremity of the rear axle 15 of the vehicle.

The side plates 12 are spaced apart by a hand or annulus 16 secured to the side plates, as by screws 17, the annulus being of different thickness throughout substantially half of its circumference, in order that the interior of the driving drum be of greater diameter throughout substantially half of its extent. Mounted for rotation within the central aperture formed by the annulus 16 is a rotor 18 carried by an axle 19 journaled in suitable bearings 20 set in appropriate recesses in the side plates 12.

The rotor 18 is provided with a plurality of radially extending slots or apertures 25 extending substantially the full width thereof, and being diametrically opposed in pairs within which are mounted vanes 26 spring pressed outwardly, as by springs 27, the opposite pairs being connected, as by rods 28 extending radially substantially through the center of the device.

It will thus be seen that when the rotor 18 is rotated in any suitable manner, either in one instance by a suitable power drive, or in other instances by the pressure of fluid upon the vanes 26 thereof, the vanes 26 will, in accordance with the spring pressure exerted thereon, closely engage the periphery of the annulus 16, being extended during their passage through the portion of the central chamber of greater circumference, and retracted during their passage during that portion of the chamber of lesser circumference. Suitable pipes 30 and 31 provide inlet and outlet means for fluid through the device, the inlet and outlet being interchangeable in a manner to be more fully described hereinafter. It is to be noted that the pipes pass through the annulus 16 and open into the central chamber of the driving drum at a point adjacent the line delineating the portion of greater circumference from that of lesser circumference.

All three of the drums previously mentioned are identical in so far as the component parts previously described are concerned. However, in the case of the drum positioned centrally of the vehicle, and adapted to be power driven in any desired manner, suitable power connections are made to the central axle 19 in order to rotate the same to effect a circulation of fluid through the pipes 30 and 31.

However, in the case of the drums 10 associated with the driving wheels of the vehicle, the outer plate 12 is provided with a boss 35, through which extends a central bore, which accommodates an extension 36 of the axle 19. A packing ring 37 is provided affording a fluid seal, as is a packing nut 38 securing the packing ring in position. The extremity of the shaft 36 terminates in a reduced portion 39 provided with splines 40 adapted to engage in corresponding grooves in a cap nut 41 secured, as by bolts 42, to the wheel hub 43, which may be of any conventional design, and which is adapted to carry the driving wheel of the vehicle. The hub 43 is mounted on suitable bearings 44 carried by the boss 35. Thus, it will be seen that when the central rotor 18 is driven in a manner to be more fully described hereinafter, the hub 43 is correspondingly rotated, which in turn rotates the driving wheels 11 of the vehicle.

Referring now particularly to Figures 7 and 8, it will be seen that both conduits 30 lead to a common conduit 50, while both conduits 31 lead to a common conduit 51. Both conduits 50 and 51 communicate with a reverse and braking mechanism generally indicated at 52.

The shifting mechanism 52 is best disclosed in Figures 3 to 6, inclusive, and comprises an outer casing 53, preferably of rectangular cross-section and provided with a filler plug and vent 54 within which is positioned a cylindrical tube 55. Slidably mounted within the cylindrical tube 55 is a second cylinder 56 to which is secured a control rod 56' which extends outwardly through the end of the housing 53, and which may be moved in any desired manner from any desired remote or adjacent control point.

The conduits 50 and 51 pass through the outer housing 53, and the cylindrical member 55 to communicate with the interior of the cylinder 55, the fluid therefrom being directed in varying paths in a manner to be more fully described hereinafter. Spaced between the inlets of the conduits 50 and 51 is an aperture 57 extending through the walls of the cylindrical member 55, and on opposite sides of the two conduits additional apertures 58 and 59 are also provided. The movable cylindrical member 56 is provided with two guideways 60 and 61 of sufficient dimensions to extend between any two adjacent apertures, that is, for example, between the aperture 57 and inlet of conduit 50, as shown in Figure 3, or between the aperture 57 and the inlet of conduit 51, as shown in Figure 4, or as indicated in Figure 5 between conduit 50 and aperture 58 and conduit 51 and aperture 59. The members 60 and 61 serve as guides for fluid, directing the same between the connected apertures in a manner and for a purpose to be more fully pointed out hereinafter. The slidable cylinder 56 is provided, between the members 60 and 61, with an aperture 62 adapted to register with certain associated apertures in the cylindrical member 55, under various conditions, as will be hereinafter described.

A main fluid inlet 63 leads from the primary or power driven drum or rotor through an end of the housing 53 and is centrally positioned to direct fluid therefrom interiorly of the cylindrical member 55. The end of the slidable cylindrical member 56 is provided with an aperture 64 adapted to register with the inlet 63 and in alignment therewith.

A fluid outlet 65 is also provided and extends into the housing 53 exteriorly of the cylindrical member 55, that is, between the member 55 and the housing 53.

From the foregoing the operation of the device should now be understandable. The main driving drum or rotor 10 is driven at any desired speed, and in any desired manner, as by means of a gasoline or an electric engine comprising a portion of the vehicle. From the main driving rotor the conduit 63 extends into the housing 53 forming an inlet for the motive fluid of the system, which is preferably oil, although other suitable fluids may be employed, if desired. With the parts in the position disclosed in Figure 3, the position of the inner sleeve 56 being controlled by the rod 56', it will be seen that fluid from the inlet 63 passes through the aperture 62 into the conduit 51 and thence through the conduit 31 to the driving drums associated with the driving wheels of the vehicle. Thus, fluid entering the conduit 31, as shown in Figure 3, will rotate, through the vanes 26, the rotor 18, in a clockwise direction (as seen in Figure 2), and correspondingly rotate the driving wheels. When the vanes 26 reach the reduced circumferential portion of the interior of the drum, the fluid will pass through the conduits 30 to the conduit 50, thence into the member 60, and through the aperture 57 into the space between the sleeve 55 and the housing 53, and through the outlet 65 back to the main driving rotor. The direction of fluid flow throughout the system is indicated by the arrows in all of Figures 3, 4 and 5.

When it is desired to utilize the fluid in the system as a brake, or alternatively to reverse the direction of the drive, the inner sleeve 56 is adjusted to the position disclosed in Figure 4 by means of the control rod 56'. In this instance fluid entering through the inlet 63 passes through the aperture 64, and thence through the aperture 62 into the conduit 50, and through the conduits 30 into the driving drums 10 associated with the wheels. Obviously, the passage of fluid in this direction will reverse the direction of rotation of the rotor 18 by reverse actions on the vanes 26, and exit from the driving drums through the conduit 31. From the conduit 31 the fluid will pass through the conduit 51 into the guide member 61, and thence outwardly through the aperture 57 into the space between the member 55 and the housing 53, and outwardly through the outlet 65.

Figure 5 discloses the position of the apparatus in neutral or non-driving position, adapted to permit continued drive of the driving rotor without affecting the rotors associated with the wheels. Under the conditions disclosed in Figure 5, fluid from the inlet 63 passes through the aperture 64 and directly through the apertures 62 and 57 into the space between the housing 53 and the cylindrical member 55 to the outlet 65. Correspondingly, both conduits 30 and 31 serve as outlets, fluid from the driving drums associated with the wheels passing into the conduit 50 and through the member 60 and the aperture 58 to the outlet 65, while fluid from the conduit 51 may pass through the member 61 and the aperture 59 to the outlet. Under conditions of actual operation, however, the system will be balanced as the pressure of the fluid within the drums and the conduits 50 and 51 will serve merely to neutralize the pressure exerted by fluid passing through the apertures 62 and 57 to prevent the entrance thereof through either aperture 58 or 59 and thence to the driving drums.

From the foregoing it will now be seen that there is herein provided an improved fluid drive for vehicles characterized by extreme simplicity of operation, as well as flexibility of control, and further by smoothness in use and operation, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

We claim:

In a fluid drive system including a reversible rotary fluid motor, a fluid pump, a pair of conduits leading from opposite sides of said pump, and a second pair of conduits leading from opposite sides of said motor, the improvement comprising a control valve for said motor, said valve comprising a hollow casing, a tubular sleeve concentrically carried by said casing inwardly thereof whereby to provide a space therearound, a hollow cylindrical slide slidable within said sleeve, one of said first-named conduits being in direct communication at all times with the interior of said slide, the other of said first-named conduits being in direct communication with said space at all times, said sleeve being formed with first, second, third, fourth and fifth ports therethrough in longitudinal spaced alignment, said second-named pair of conduits being in open communication with said second and fourth ports at all times, said slide being formed with a pair of inwardly-directed guides in longitudinally-spaced alignment, said guides comprising bridging channels each adapted to span two of said ports to connect the same, said slide being formed with a port therethrough intermediate said guides and in spaced alignment therewith, said last-named port being adapted to be selectively registerable with said second, third and fourth ports of said sleeve with at least one of said guides bridging at least one adjacent pair of said remaining ports, whereby to provide respectively forward, neutral and reverse positions of said slide, and means for moving said slide to a selected position.

ISEDOR IVERSON.
S. M. SIMONSON.

REFERENCES CITED

The following references are of record in the file of this patent:

UNITED STATES PATENTS

| Number | Name | Date |
| --- | --- | --- |
| 183,909 | Curtis | Oct. 31, 1876 |
| 751,319 | Maurer | Feb. 2, 1904 |
| 1,008,202 | Schmucker | Nov. 7, 1911 |
| 1,056,606 | Vaughan | Mar. 18, 1913 |
| 1,426,902 | Noel | Aug. 22, 1922 |

FOREIGN PATENTS

| Number | Country | Date |
| --- | --- | --- |
| 179,854 | Great Britain | May 18, 1922 |